Sept. 30, 1969    M. GREENBERG    3,469,325
COORDINATED GROUP OF ELEMENTS CONSTITUTING A TEACHING AID
Filed Aug. 10, 1967    3 Sheets-Sheet 1
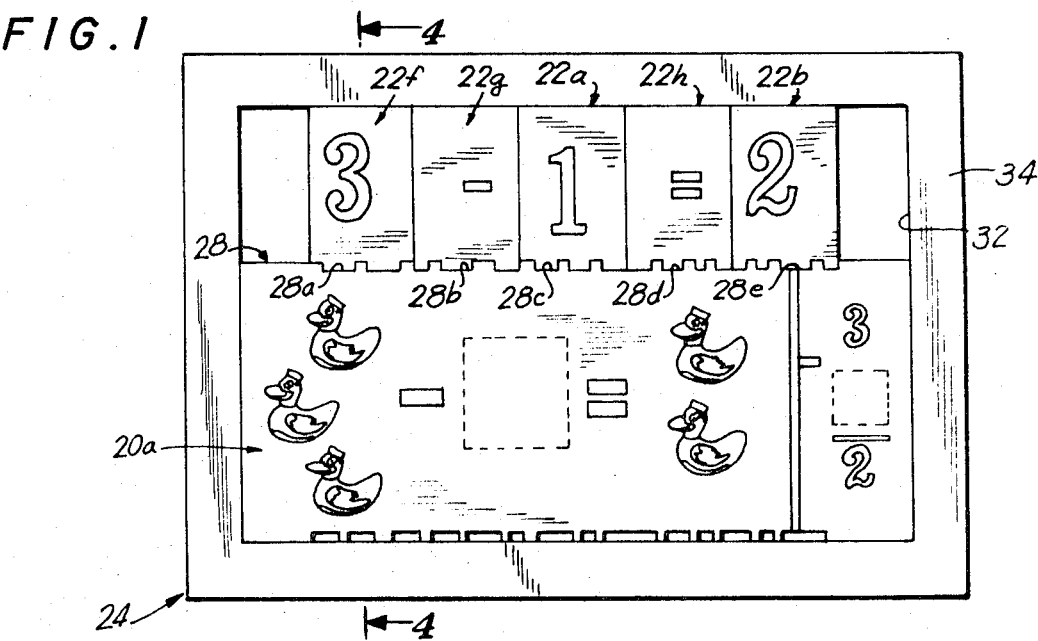
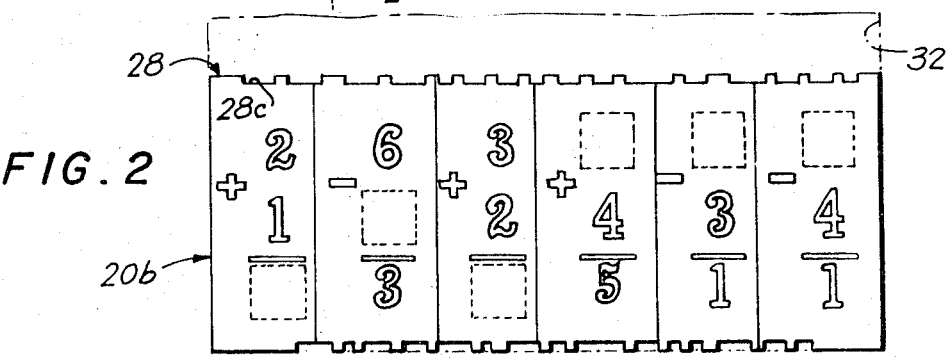
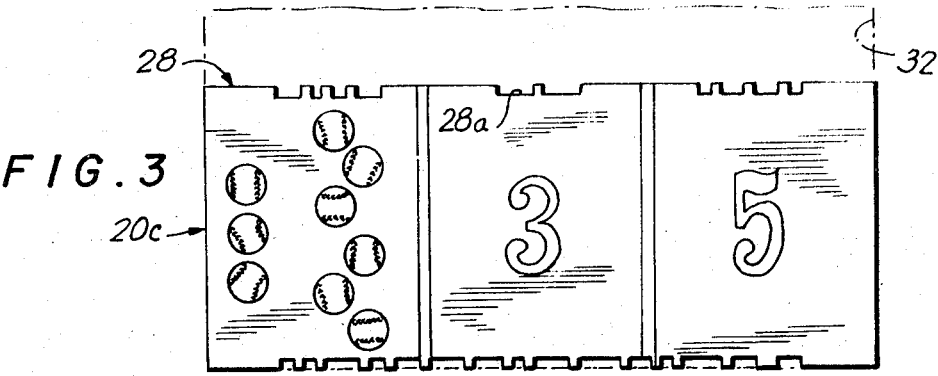
INVENTOR.
MALVIN GREENBERG
BY
ATTORNEYS Sept. 30, 1969   M. GREENBERG   3,469,325
COORDINATED GROUP OF ELEMENTS CONSTITUTING A TEACHING AID
Filed Aug. 10, 1967   3 Sheets-Sheet 2
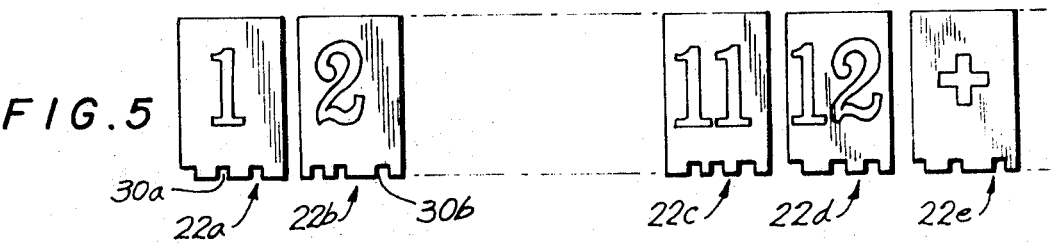
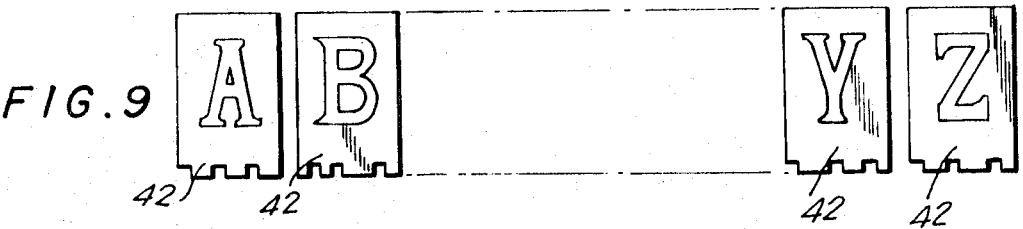
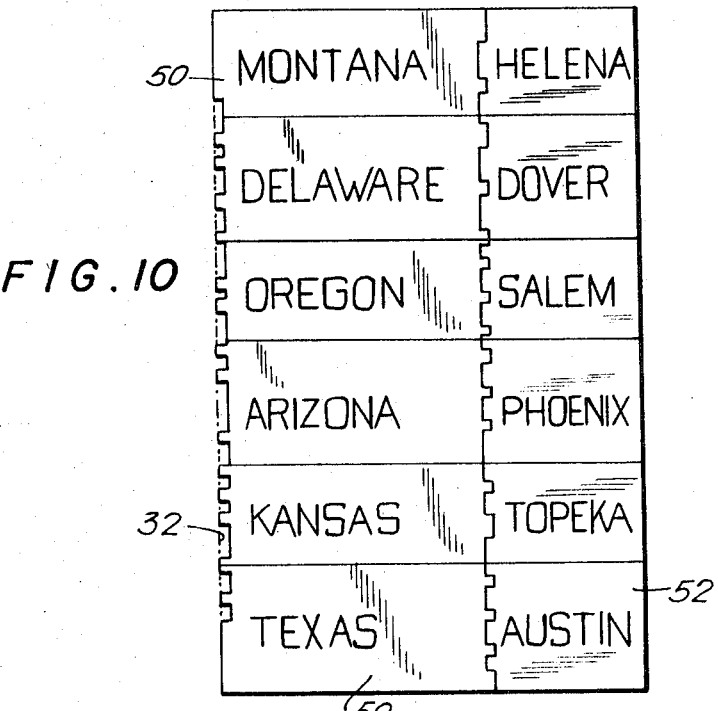
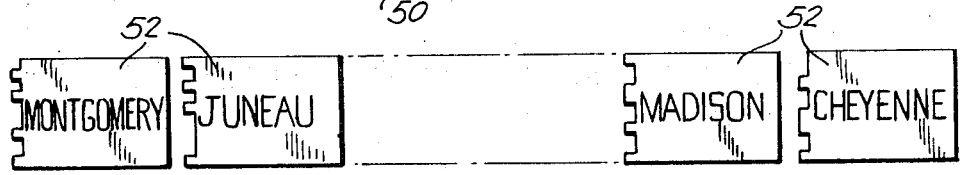
*INVENTOR.*
MALVIN GREENBERG
BY
ATTORNEYS Sept. 30, 1969  M. GREENBERG  3,469,325
COORDINATED GROUP OF ELEMENTS CONSTITUTING A TEACHING AID
Filed Aug. 10, 1967  3 Sheets-Sheet 3
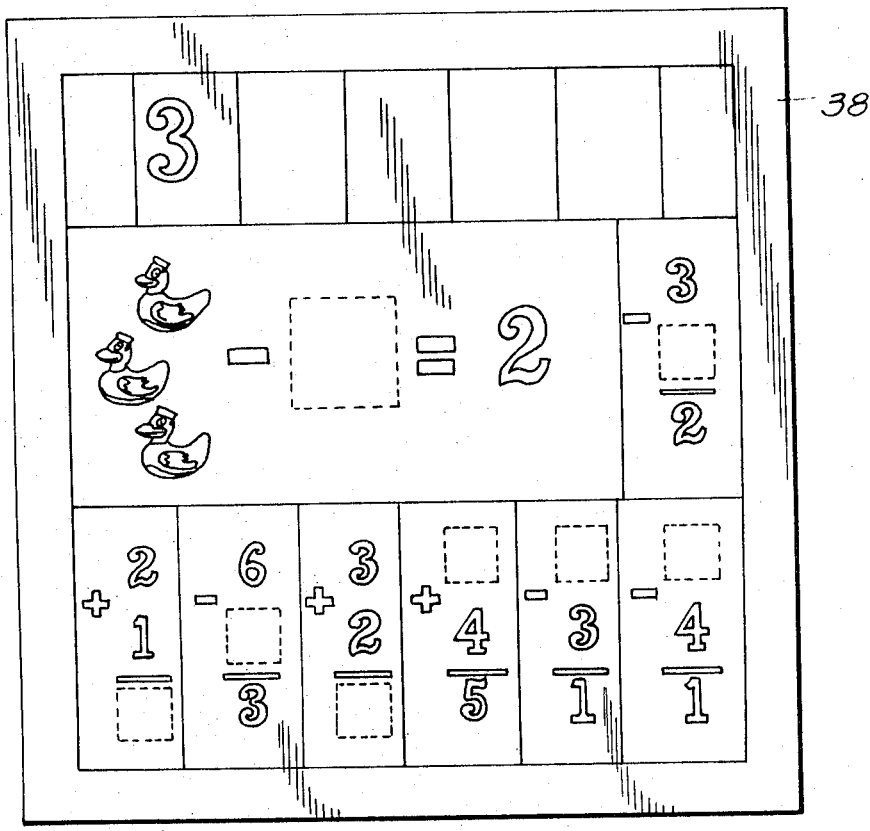
FIG. 7
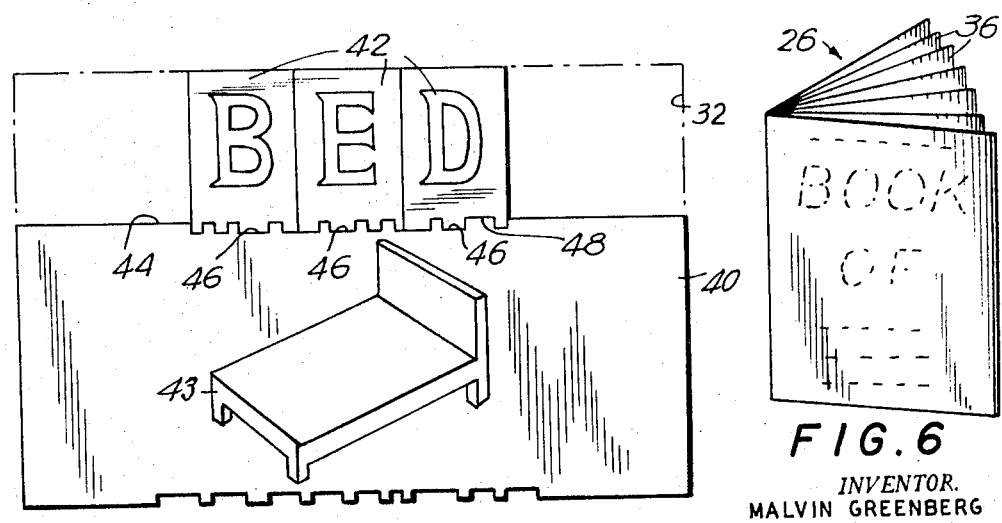
FIG. 8
FIG. 6
INVENTOR.
MALVIN GREENBERG
BY
ATTORNEYS United States Patent Office 3,469,325
Patented Sept. 30, 1969

3,469,325
COORDINATED GROUP OF ELEMENTS CONSTITUTING A TEACHING AID
Malvin Greenberg, Commack, N.Y., assignor to Schoolhouse Industries, Inc., Commack, N.Y., a corporation of New York
Filed Aug. 10, 1967, Ser. No. 659,804
Int. Cl. G09b 3/00, 19/00
U.S. Cl. 35—9                                6 Claims

ABSTRACT OF THE DISCLOSURE

A teaching aid composed of a group of correlated elements which constitute several problem cards, several answer cards, a frame and a workbook. Each answer card has a single edge of coded configuration which is unique to information printed on that card and each problem card has one edge of coded configuration to match answer cards that correspond to the information required by stimulus printed on the problem card. There are sufficient answer cards from which selections can be made to match the coded edge of any selected problem card. The frame has a shallow recess to receive a single problem card with an elongated space left alongside the coded edge of such card, which space is just wide enough to admit a row of matching answer cards. The workbook is coordinated to the problems presented by the problem cards having pages on which such problems are printed along with adjacent blank spaces for inscriptions of answers by a pupil.

BACKGROUND OF THE INVENTION

Field of the invention

A teaching aid for small children composed of a frame which receives a problem card in a recess of such a size that just enough room is left to admit proper answer cards which are arranged in a row on one edge of the problem card. The problem cards and answer cards have matching coded configurations to ensure that only the proper answer cards can be physically associated with any given problem card. The teaching aid also includes a workbook which is coordinated to the various problems printed on the problem cards and has pages on which these problems are printed along with adjacent blank spaces for the inscription of answers by a child. The problems embrace all types of educational subject areas, such, for example, as spelling, arithmetic, social studies, grammar, geography and history.

Description of the prior art

It has been proposed heretofore to employ problem cards and answer cards with matching edges of coded configuration. It also has been proposed to provide a frame having recesses for reception of cards. Furthermore, workbooks are a standard adjunct of teaching. However, it has not been known to combine all of these four elements, that is to say, problem cards and answer cards of the character described, a frame and a workbook, to form a coordinated group which as a unitary combination is effective in increasing motivation and multiply reinforcing classroom teaching.

SUMMARY OF THE INVENTION

It is an object of the present invention to provide a teaching aid of the character described which is particularly useful in teaching and aiding the teaching of small children by the presentation of problems and the use of visual recognition of symbols and shapes to aid them in selecting a proper answer.

It is another object of the present invention to provide a teaching aid of the character described which, after assisting the child in selecting the proper answer, reinforces the child both positively and negatively, and subsequently again reinforces through appropriate use of the workbook.

It is another object of the invention to provide a teaching aid of the character described which is so selected that multiple answer cards placed alongside the matching edge of a problem card are received in an elongated space provided for this purpose in such a fashion that the answer cards are arranged in abutment in a row so as to either present a complete answer composed of plural elements or to again present the problem together with its answer as a coherent group of symbols, so that the child can see the problem and answer as a complete whole.

It is another object of the invention to provide a teaching aid of the character described in which the child, after placing the problem card in the frame, can construct the answer by selection and manipulation of plural individual answer cards, so that if the cards interfit properly, the child immediately knows he has solved the problem and will enthusiastically continue to the next problem, and after opening the workbook to the appropriate page, will write the answer to that problem. In this way he obtains the initial reinforcement of fitting the answer (response) cards to the problem (stimulus) cards and the subsequent reinforcement of again associating the answer with the problem in the workbook before proceeding to the next problem.

It is another object of the invention to provide a teaching aid of the character described which is of rugged and economical construction, so that it can be manufactured at an inexpensive price so as to be widely disseminable in schools, and also will withstand the abuse of small children.

Other objects of the invention in part will be obvious and in part will be pointed out hereinafter.

The invention accordingly consists in the features of construction, combination of elements, and arrangement of parts which will be exemplified in the articles hereinafter described and of which the scope of application will be indicated in the appended claims.

BRIEF DESCRIPTION OF THE DRAWINGS

In the accompanying drawings in which are shown various possible embodiments of the invention, FIG. 1 is a plan view of a frame with a problem card and a group of matching answer cards fitting into a recess in said frame;

FIGS. 2 and 3 are plan views similar to FIG. 1 of other problem cards which can be received in the same frame as that illustrated in FIG. 1;

FIG. 4 is a cross-sectional view taken substantially along the line 4—4 of FIG. 1;

FIG. 5 is a plan view of a series of answer cards such as are designed to be used with the problem cards shown in FIGS. 1, 2 and 3 and with other problem cards of an arithmetic character;

FIG. 6 is a perspective view of a workbook designed to be used with the problem cards, answer cards and frame of FIGS. 1, 2, 3 and 5 and others of the same kind;

FIG. 7 is a plan view of one of the pages of the workbook of FIG. 6;

FIG. 8 is a view of a different kind of problem card, namely a spelling card, and of the alphabet answer cards corresponding to that problem card;

FIG. 9 is a plan view of a series of alphabet answer cards of the type adapted for use with spelling problem cards like that shown in FIG. 8;

FIG. 10 is a plan view similar to FIG. 8 of another kind of problem card, namely a geography card, and its affiliated capital answer cards; and FIG. 11 is a plan view of a series of capital answer cards of the type adapted to be employed in connection with geography problem cards like that shown in FIG. 10.

DESCRIPTION OF THE PREFERRED EMBODIMENTS

Referring now in detail to the drawings, and more particularly to FIGS. 1–7, there is shown a teaching aid composed of a group of elements having a coordinated relationship. According to the present invention the elements consist of several large rectangular problem, i.e. stimulus paperboard cards 20a (FIG. 1), 20b (FIG. 2), 20c (FIG. 3); several small rectangular answer paperboard cards, i.e. response cards, 22a, 22b, 22c, 22d, 22e, 22f, 22g and 22h; a frame 24; and a workbook 26.

The teaching aid which is illustrated in FIGS. 1–7 is a teaching aid for simple arithmetic. Subsequently, there will be described elements of a teaching aid for simple spelling (FIGS. 8 and 9) and a teaching aid for simple geography (FIGS. 10 and 11).

The teaching aid has a suitable number of problem cards to introduce a small child to the new discipline and to awaken and maintain his interest. It is understood, of course, that the number of problem cards in any single teaching aid will, as a practical matter, be largely controlled by economic considerations. A typical teaching aid which has been found to be highly useful and satisfactory contains ten problem cards. Each card may present one problem or several problems. Where several problems are contained on one card they may be of the same presentation type or of different presentation types. Also, problems may be printed on both sides of the problem card.

Referring to FIG. 1, the problem card 20a presents the same problem but in two different educational concepts. The problem occupying the larger left hand portion of the card 20a is the arithmetic problem "three minus what equals two." This problem is presented pictorially, that is to say, reading from left to right, there are three objects, in this instance caricatures of ducks, followed by a minus symbol, followed by a blank space, all of which are on the left of an equal symbol to the right of which is a group of two caricatures of ducks. Thus, the problem presented by this card 20a is, how much taken away from a group of three equals a group of two. The child solving this problem may not yet visualize or fully appreciate the concept of numbers. Only objects are involved in this problem and the stimulus presented by it. The objects and the symbols are imprinted on the face of the card.

The same problem is presented in a smaller space at the right hand portion of the card, but here the problem is presented numberwise, that is to say, by arabic numerical symbols. Moreover, whereas the problem at the left hand portion of the card was presented in horizontal alignment, as in an equation, the same problem is presented at the right hand portion of the card in a more conventional arithmetical sense, to wit, in a vertical column with a totaling line beneath a column of figures to be handled and above the result. To avoid confusion, it is preferable that where the child is being taught how to solve a specific arithmetic problem, starting without the concept of numbers, the two problems on the same face of the card, one presented as a groups concept and the other as a numbers concept, be the same.

In FIG. 2 a different kind of arithmetic problem card 20b is shown in which several problems are imprinted which problems are of different values, i.e., use numbers different from one another, but are arranged in the same manner, that is to say, vertically with the arithmetic manipulation symbol, plus or minus, but with a totalizing line instead of an equal symbol. In each of these problems only three numbers are used, although more can be employed, and in each instance one number is left out, either the answer or one of the numbers being added or subtracted. The order of difficulty of the problems presented by the problem card 20b is a step above that presented by the problem card 20a inasmuch as the problem card 20a is seeking to impart the concept of numbers through the medium of a single specific problem presented in two fashions, whereas the problem card 20b assumes a knowledge of numbers and presents several problems involving different numbers.

The third problem card 20c, shown in FIG. 3, is the simplest of the problem cards and seeks to imbue the child with the concept of transforming groups of objects into numbers and of matching number to number. Thus, in the left hand frame in FIG. 3 nine objects (baseballs) are printed. The purpose of this card is to have the child associate the arabic number "9" with a group of nine objects. The central and right hand frames of the problem card 20c envisions the child's previously formed recognition of numbers and seeks only to reinforce the knowledge of numbers by imprinting specific arabic numbers in the frames which the child must recognize. Thus, the child would progress from the first card 20c to the second card 20a to the third card 20b in succeeding stages of difficulty.

It will be appreciated that the reverse sides of all of these cards preferably have other problems imprinted thereon.

However, considering only the problems, that is to say, stimuli, presented by the illustrated face of the problem cards and adverting in particular to the problem card 20a, the problem there, as mentioned above, is, what number subtracted from three equals two. There are five mathematical symbols involved, to wit, "3," "1," "2," "−" and "=." One of the functions of the teaching aid is to have the child associate the numbers with the groups and the symbols with the symbols, so that not only will he be able to understand and appreciate that it is one which when subtracted from three equals two, but that there is an equation involved, a balancing of numbers, and so that he can himself fit together and appreciate the equation.

All of the problem cards are of rectangular configuration and have an edge which is uppermost when the problem is in its normal reading position for the pupil, i.e., right side up rather than upsided own. This edge is indicated by the reference numeral 28. The top edge 28 is formed with a coded configuration. Actually, this coded configuration breaks down into adjacent segments 28a, 28b, 28c, 28d and 28e each of which is individually formed to a coded configuration. Each coded configuration uniquely corresponds to the corresponding part of the given equation. Thus, there are five coded configurations along the upper edge 28 of the problem card 20a, each corresponding to a different group of objects or a different number or a different arithmetic manipulative symbol.

The first segment 28a of coded configuration uniquely corresponds to the arabic symbol three. If there are any other cards where the stimulus calls for the number three as a response, there will be a segment of identical coded configuration. Thus, referring, for example, to the first segment on the top edge 28a of the problem card 20b where the problem below this segment requires the response "3," said top edge segment 28a has a code configuration corresponding to "3." The same is true of the segment 28a of the top edge 28 of the problem card 20c for the central frame.

Similarly, referring back to FIG. 1, the second segment 28b has a coded configuration which is unique for a minus symbol. In other words, every segment of a top edge of every problem card has a coded configuration which is unique for some specific response, whether it be, in an arithmetic game, a number or a symbol.

It will be observed that there is a similar row of coded configurations along the lower edge of each of the problem cards 20a, 20b, 20c. This lower edge as shown in these figures is for the problems on the reverse side of said problem cards inasmuch as when said problem cards are inverted, the former lower edge becomes the top edge.

The answer cards 22 likewise are of rectangular configuration. Each has a lower edge 30a, 30b, etc. of code configuration that is unique for the information (response) imprinted thereon and which matches the code configuration for a code configuration segment 28a, 28b etc. on a problem card which corresponds to that information. The answer cards are of the same overall proportions and dimensions, that is to say, all answer cards are of the same width and all answer cards are of the same height. The cards only differ from one another in the coded configurations for their lower edges and in the response material imprinted on the sundry cards. All cards with identical response material have the same coded configuration at their lower edges. Specifically if there are three answer cards with the arabic number 3 imprinted thereon, each of these cards will have an identical coded configuration at their lower edge.

The frame 24 is in the form of a rectangular panel of self-form-maintaining material, e.g. paperboard, having a shallow rectangular recess 32 in the front face thereof. To impart an attractive appearance the recess is symmetrically disposed in the frame and thereby is surrounded by a border 34 which is of uniform width for all sides. The dimensions of the recess are so selected that the recess is just wide enough to admit the width (in a left-to-right direction as shown in FIG. 1) of any problem card 28a, 28b etc., all problem cards being of the same width and the same height. The depth of the recess is equal to the thickness of the answer cards. The height of the recess 32 from top to bottom is such that it will just admit the combined height of a problem card and one or more matching answer cards, it being apparent that the top edges of plural matching answer cards are in alignment so that no one top edge of any matching answer card is further from the bottom edge of the problem card than the top edge of any other answer card. However, if the answer card does not match the segment of the coded edge of the problem card, the combined height of such answer card and the problem card exceeds the height of the recess 32. Accordingly, when a problem card alone is located in the recess 32 with its bottom edge juxtaposed to the bottom of the recess there will be provided between the coded top edge of the answer card and the top edge of the recess an elongated space that runs alongside of the coded top edge of the problem card which elongated space is just high enough to receive one or more answer cards that match the coded configuration of the top edge of the problem card. The height of this recess is such that these answer cards will be snugly received therein. Hence, an answer card which does not match a part of the top edge of the problem card against which it is placed will not be able to fit into the recess. Many such answer cards are provided, the number being substantially in excess of the number required to match the coded configurations of the edge of any single problem card. In the teaching aid under discussion three sets of arithmetic answer cards are included as a group, each set including the arabic numbers 1 through 10, a plus symbol, a minus symbol, and an equal symbol. Thus in the group of answer cards there is more than one of each specific answer card, this being done in order to enable plural like numbers to be used in equations requiring the use of such numbers as for example 1+1=2 and also to confront the student with a large choice from which he must make a reasoned and educational selection.

The workbook 26 (FIG. 6) constitutes a book with several sheets 36 bound together forming pages 38 of which a typical page is shown in FIG. 7. The pages again present the problems symbolically, pictorially and numerically in the same manner as on the problem cards and in the same manner as is represented by a composite set of answer cards that supply a conjoint answer to a problem. As noted previously there are different types of problems as well as different specific problems and these are presented again by printing on the sundry pages of the workbook. The problems in this arithmetic type of game now being described may consist of simply inscribing individual numbers to match printed numbers, of inscribing individual numbers to match groups of objects, and of inscribing missing numbers in equations or columns to complete the equation or column.

For example, in the page 38 shown in FIG. 7, there is at the top of the page a horizontal row of squares. The left hand square has the numeral 3 imprinted thereon. The balance of the squares are empty, the purpose being to have the child inscribe the numeral 3 in the balance of the squares. Below that there is a frame showing the outline of three objects followed by a minus symbol followed by a dotted rectangle, all to the left of an equal symbol, to the right of which is the arabic numeral 2. It will be recognized that this is essentially the same problem as is shown pictorially in the left hand portion of the problem card 20a in FIG. 1. The student examining this problem is supposed to write the numeral 1 in the dotted rectangle. To the right hand side of the equation on the page 38 is a reproduction of the problem shown in the right hand portion of the problem card 20a. In the lower part of the page 38 are reproductions of the problems shown on the problem card 20b.

Attention is called to the fact that the pictorial representations of the objects are simply outline representations in order to enable the student to color in the objects.

To use the teaching aid a student starts with the simplest of the problem cards such for instance as the problem card 20c. He places this problem card in the recess 32 of the frame 24 with the lower edge of the card abutting the bottom edge of the recess and with the side edges of the card snugly fitting against the side edges of the recess. The top edge 28 of the card with the coded configurations thereon thereby is spaced from the top edge of the recess so as to leave an elongated space for reception of properly matched answer cards. The student then looks through the group of answer cards, and selects from it an answer having printed thereon a correct response to each given stimulus.

The problem card 20c is designed to present one of the earliest problems that the student will perform, i.e. to recognize numbers. Consider for example the central frame of the problem card 20c on which there is imprinted the arabic numeral 3. The student will search through the group of answer cards until he recognizes a card with the arabic numeral 3 imprinted thereon or what he thinks is the arabic numeral 3. He will pick up this card and try to place it in the elongated space above the central frame. If he has picked the correct answer card the code configuration on the lower edge of the answer card will match the code configuration on the upper edge of the problem card so that these two edges will mesh. Thereby there will be sufficient room to insert the answer card so that its top edge will abut the top edge of the recess. However, if the student picks the wrong card as, for instance, the answer card with the arabic numeral 2 thereon, the code configurations will not match. Thereby the answer card will effectively be too high to fit into the recess. It will be appreciated that when the correct answer card is selected by the student it will just fill the space above the problem, i.e., it will occupy only the space available for the correct response to the problem.

Thus, the placement of the problem card into the recess of the frame forms the stimulus, since such placement actually poses a problem or question for the student. The student must respond manipulatively by placing the answer card in its coded space. The student may well do this with only the coded configuration as a guide. This, nevertheless, requires visual discrimination on the part of the student and is beneficial to his reading readiness growth. Also, the student will respond by visually matching the arabic numerals. When the student selects the answer card which properly fits into the coded picture card he knows immediately that his response was correct. This constitutes a positive reinforcement which is considered to be a prime factor in the learning process. By the same token, if the answer card which the child selects does not fit into the coded configuration on the problem card, it may be considered a negative reinforcement and is equally important to the discipline of learning. Although the student may have used only the coded configuration of the answer card and problem card for discrimination, the next step will be for the student to direct his attention to the numerals themselves which he can compare visually. The student then turns to an appropriate page in the workbook and he writes numerals which he has associated with the numerals on the problem cards. He must actually inscribe these numerals into the workbook which again reinforces his understanding of the concept of the numeral.

The student may then go on to a more advanced problem such as that on the left hand side of the problem card 20c in which he must associate an arabic numeral with a group of a certain number of objects. In this fashion he comes to associate an abstract numeral with a group of objects of the same number. Once again the workbook will repeat the problem and this time the student must himself write down the abstract numeral alongside the group of objects of the same number, except that he now will not have the matching coded edges which he originally used to reinforce his knowledge. The student is, in effect, when he fills in the problem in the workbook for a second time, reinforcing his concept a second time of that particular number.

Moreover, as noted previously, the objects as printed in the workbook are only printed in outline. The student therefore is instructed to color the objects and in coloring each object within the outline he comes to understand that there are a certain quantity of objects, i.e. a certain number of objects, which he will associate with the numeric symbol for that number.

The student may now turn to a more difficult problem such as that outlined on the left hand side of the problem card 20a. There the problem of 3 minus what equals 2 is repeated in the coded configuration at the top of the card which will receive only the answer cards for the symbols "3" "—" "1" "=" "2." Once more the student goes through the same process of stimulus, response, first positive reinforcement, negative reinforcement and second positive reinforcement, the latter being by virtue of the working of the problem for a second time in the workbook. The workbook page 38 shown in FIG. 7 repeats the foregoing problem and shows how the objects are printed in outline only to encourage a child to color in the objects and, through the separate coloring steps, in his mind associate the number of objects with the concept of numbers. The child also in the given problem will fill in the arabic numeral 1 in the empty square left for this purpose in the workbook page. Attention is directed to the fact that the answer cards for the problem card 20a abut one another transversely to formulate a complete response as a coherent group of symbols.

The child now is ready to progress to the more conventional arithmetic discipline rather than the new math discipline shown on the left hand side of the card 20a. The standard arithmetic concept shown in the right hand side of the problem card 20a has the problem repeated but this time in a vertical column. This vertical arrangement is again presented on page 38 of the workbook illustrated in FIG. 7 where the child will review the problem and inscribe the arabic numeral 1 in the dotted blank rectangle left for this purpose, reinforcing his knowledge of the particular problem for a second time.

The student can now go on to the still more advanced problems of this discipline by putting the problem card 20b into the recess 32. The coded edge 28 of the problem card 20b contains several coded segments, each of which matches only the single correct numeral answer indicated by the dotted rectangle in each problem column. Thus the answer to the problem in the left hand frame of the card 20b is 1. The coded configuration 20c is a coded configuration which only will be matched by the coded configuration 30a of the answer card 22a on which the arabic numeral 1 is imprinted. The student therefore in answering this first problem will go through the same series of steps. He will respond manipulatively. He will also respond after a time through an appreciation of the concept of numbers. He will have his visual discrimination aided. He will be positively reinforced a first time by the fact that a card with this number is the only card which will fit into the vertical height of the elongated space above the problem card. He will be negatively reinforced in his selection by the fact that no other answer card will fit properly and then he will turn to the workbook and be positively reinforced for the second time when he completes his answer to this problem which duplicates the problem just described.

The teaching aid of the present invention has been thus far described solely in connection with an arithmetic discipline. It can be used in conjunction with any other type of discipline, i.e. different educational subject area. Exemplificative thereof are: spelling, social studies, grammar, geography and history. FIGS. 8 and 9 show the teaching aid as applied to spelling and FIGS. 10 and 11 show the teaching aid as applied to geography.

Referring to FIGS. 8 and 9 there is shown a problem card 40 and a group of answer cards 42. The problem card is shaped and dimensioned to fit into the recess 32 of the frame 24 in the same manner as the problem cards 20a, 20b, etc. Several problem cards are provided, only one being shown. Each problem card has imprinted thereon some object, preferably an object with a very simple spelling of its name, such as a three letter or four letter word. In the particular instance given there is imprinted thereon a picture 43 of a bed. The upper edge 44 of the problem card 40 is provided with segments of coded configurations 46 each of which is uniquely shaped to receive a matching coded edge 48 of a different answer card 42, the coded configurations being such that the responses imprinted on the different matched answer cards 42 will spell the name of the object 42 imprinted on the problem card 40, in this instance "bed." The configurations 46 are immediately adjacent one another so that the answer cards are laterally abutted to formulate the spelling response as a coherent group of letters.

It will be observed that the elongated space in the recess above the edge 44 of the problem card is of the proper height just to receive matching answer cards. Answer cards which do not have matching coded configurations will have their upper edges overlap the upper edge of the recess 32 so that they cannot be received in said recess.

The learning process for the spelling discipline is the same as that for the arithmetic discipline and will not, therefore, be repeated in detail. However, it is pointed out that as in the case with the arithmetic discipline the workbook for the spelling discipline, which may constitute a separate workbook or additional pages in the workbook 26, provides a blank outline of the object so as to encourage the student to color the same and maintain his interest. It also contains blank spaces framed by dotted rectangles in which the child after learning the spelling of the object in the workbook inscribes the letters that spell out the name of the object.

As in the case of the arithmetic problem cards each of the spelling problem cards 40 is made to obtain maximum use of the cards by having different spelling problems on its reverse side and the card then will include a coded configuration on its opposite edge which as shown in FIG. 8 is its bottom edge, this coded configuration being such as to accept only matching answer cards which have imprinted thereon the letters of the alphabet that jointly will spell out the name of the object printed on the reverse side.

A group containing a large number of answer cards 42 (FIG. 9) is provided, enough so that a student can spell out the name of every object for every problem card. The answer cards therefore will, in effect, have almost all of the letters of the alphabet imprinted on different cards, preferably all so that the student will come to recognize even infrequently used letters like "*x*" and "*q*", and there will be duplicate cards for some letters to enable words to be spelled where duplicate letters are necessary such for example as "bee" and "ball".

A large number of answer cards is desired both in the spelling teaching aid and the arithmetic teaching aid, as well as in many other disciplines because it forces the student to make a proper selection from a large group and thereby causes him to exert his utmost skill; whereas, if only a few answer cards were provided the learning process would become too simple and, therefore, boring, resulting in discarding of the teaching aid. By using a large number of cards the student's interest is whetted.

A teaching aid for a geography discipline is illustrated in FIGS. 10 and 11. In FIG. 10 there is seen a geography problem card 50 which is of the same dimensions as the problem cards 20a, 20b, etc. and 40 and thereby is designed to fit into the recess 32 in the frame 24. The problem card 50 is more sophisticated than the problem cards for simple spelling as heretofore described.

The particular element of geography to be taught by the problem card 50 is the state-capital relationship for the various states of the United States. The problem card 50 is subdivided into several, e.g., six, frames each having imprinted thereon the name of a different state. Other similar problem cards bear the names of different states. The answer cards 52 designed to be used with the problem cards contain the names of the capitals of the states. The answer cards also might contain the name of the state flower or a principal manufactured product or a principal ore, etc.

One of the edges of the problem card 50, an edge that also defines an edge of all the frames printed on the states, is of physically coded configuration, this being the edge which runs alongside the elongated space bounded by one edge of the recess 32 and said coded edge of the problem card. The segment of the coded edge of the problem card associated with each of the separate state frames is matched to a corresponding coded edge of an answer card which will only fit into such coded configuration of the problem card when the correct answer card is chosen. Only a correct answer card will fit into said recess 32.

There is a group of such answer cards as illustrated in FIG. 11 from which the student must chose to obtain the correct answer cards. There are enough answer cards to supply answers to all of the problem cards which in this particular geography problem presented will be fifty answer cards. Here too there will be appropriate pages in the workbook on which there are imprinted names of states with blank spaces alongside of them to inscribe the names of the correct capitals and names of capitals with blank spaces alongside them with places for inscribing the names of the correct matching states.

It thus will be seen that there have been provided teaching aids which achieve the several objects of the invention and which are well adapted to meet the conditions of practical use.

As various possible embodiments might be made of the above invention and as various changes might be made in the embodiments above set forth, it is to be understood that all matter herein described is to be interpreted as illustrative and not in a limiting sense.

Having thus described the invention, there is claimed as new and desired to be secured by Letters Patent:

1. A teaching aid composed of a group of correlated elements consisting of problem cards, answer cards, a frame and a work book, each answer card having a single edge of coded configuration of rectangular projections spaced by rectangular notches, the corners of the projections and of the notches being square and the combination of the widths of individual notches and projections for any specific answer card being uniquely different from the combination of widths of individual notches and projections for any other answer card being a different answer, and a response imprinted on the answer card which is unique to that answer card and to that coded configuration, each problem card having a stimulus printed on one face thereof and a different stimulus printed on the opposite face thereof and each problem card having two opposed edges of coded configuration which match the coded configurations of the answer cards that correspond to the responses required by the stimuli on the opposite faces of the problem card, each such edge of coded configuration of each problem card being associated with a stimulus on one face only of the problem card, the number of answer cards being substantially in excess of the number required to match the coded configuration of the edges of any single problem card so that a student will be required to make a selection from a large number of answer cards to match any given problem card, the frame comprising a panel having a shallow recess therein, said recess being just large enough to receive a problem card with an elongated space left alongside the coded edge of such problem card, with such space being just wide enough to admit matching answer cards, said work book having pages therein on which are printed the same stimuli as on the problem cards without the coded configuration and with identical adjacent blank spaces for the inscription of the same answers by a student.

2. A teaching aid as set forth in claim 1 wherein the stimuli constitute arithmetic problems imprinted on the problem cards and wherein the responses on the answer cards constitute numerals and arithmetic manipulative sysbols.

3. A teaching aid as set forth in claim 2 wherein the stimuli include equations, columns, numerical symbols and groups of objects.

4. A teaching aid as set forth in claim 1 wherein the problems printed in the workbook include outlines of objects for coloring by a student.

5. A teaching aid as set forth in claim 1 wherein the stimuli constitute spelling problems and wherein the responses on the answer cards constitute letters of the alphabet.

6. A teaching aid as set forth in claim 1 wherein the stimuli constitute names of states and wherein the responses constitute the names of state capitals.

References Cited

UNITED STATES PATENTS

| 163,912 | 6/1875 | Birmeli | 35—71 |
| 777,268 | 12/1904 | Thompson | 35—70 |
| 3,224,114 | 12/1965 | Swanson | 35—31 |
| 3,302,310 | 2/1967 | Leven. | |

FOREIGN PATENTS 997,145  7/1965  Great Britain.

EUGENE R. CAPOZIO, Primary Examiner

W. H. GRIEB, Assistant Examiner

U.S. Cl. X.R.

35—31, 35; 273—156